US009003387B2

(12) United States Patent
Van Camp et al.

(10) Patent No.: US 9,003,387 B2
(45) Date of Patent: Apr. 7, 2015

(54) AUTOMATED DEPLOYMENT OF COMPUTER-SPECIFIC SOFTWARE UPDATES

(75) Inventors: Kim O. Van Camp, Georgetown, TX (US); Bob Wiggins, Austin, TX (US); Naqi Syed, Pflugerville, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 750 days.

(21) Appl. No.: 12/883,664

(22) Filed: Sep. 16, 2010

(65) Prior Publication Data

US 2011/0078675 A1 Mar. 31, 2011

Related U.S. Application Data

(60) Provisional application No. 61/246,008, filed on Sep. 25, 2009.

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
USPC .......................................................... 717/170
See application file for complete search history.

(56) References Cited

U.S. PATENT DOCUMENTS

| 5,999,740 | A | 12/1999 | Rowley | |
|---|---|---|---|---|
| 6,282,709 | B1 * | 8/2001 | Reha et al. | 717/175 |
| 7,227,656 | B1 | 6/2007 | Kato | |
| 7,289,994 | B2 * | 10/2007 | Nixon et al. | 1/1 |
| 7,539,978 | B1 * | 5/2009 | Haddox et al. | 717/130 |
| 7,620,948 | B1 * | 11/2009 | Rowe et al. | 717/171 |
| 7,975,266 | B2 * | 7/2011 | Schneider et al. | 717/178 |
| 8,286,154 | B2 * | 10/2012 | Kaakani et al. | 717/168 |
| 2004/0181787 | A1 * | 9/2004 | Wickham et al. | 717/168 |
| 2005/0132349 | A1 * | 6/2005 | Roberts et al. | 717/168 |
| 2005/0228798 | A1 * | 10/2005 | Shepard et al. | 707/100 |

(Continued)

FOREIGN PATENT DOCUMENTS

| CN | 101410800 A | 4/2009 |
|---|---|---|
| GB | 2 465 495 A | 5/2010 |

(Continued)

OTHER PUBLICATIONS

Search Report for Application No. GB1015879.8, dated Jan. 13, 2011.

(Continued)

*Primary Examiner* — Li B Zhen
*Assistant Examiner* — Sen Chen
(74) *Attorney, Agent, or Firm* — Marshall, Gerstein & Borun LLP

(57) ABSTRACT

A software update system automatically deploys software updates, approved by a provider of a process control system, to computer hosts that execute the process control system. The software update system includes a client application that generates a request for software updates applicable to the computer hosts and initiates automatic deployment of the software update to the host, and a server application that provides software update data to the client application in response to the request.

23 Claims, 8 Drawing Sheets

(56) References Cited

U.S. PATENT DOCUMENTS

| | | | |
|---|---|---|---|
| 2007/0022403 A1* | 1/2007 | Brandt et al. | 717/100 |
| 2007/0169079 A1* | 7/2007 | Keller et al. | 717/168 |
| 2009/0094462 A1* | 4/2009 | Madduri | 713/182 |
| 2009/0133012 A1* | 5/2009 | Shih | 717/169 |
| 2010/0146497 A1 | 6/2010 | Kogan et al. | |

FOREIGN PATENT DOCUMENTS

| | | |
|---|---|---|
| JP | 2002-007129 | 1/2002 |
| JP | 2009-187420 | 8/2009 |

OTHER PUBLICATIONS

Examination Report Under Section 18(3) in Application No. GB1015879.8, dated Mar. 13, 2014.

First Office Action for corresponding Chinese Patent Application No. 201010572412.4, Dated: Jun. 5, 2014, 8 pgs.

Examination Report under Section 18(3) in Application No. GB1015879.8 dated Oct. 1, 2014, 3 pgs.

Office Action for corresponding Japanese Patent Application No. 2010-215391, dated Aug. 19, 2014, 4 pgs.

\* cited by examiner

AUTOMATED DEPLOYMENT OF COMPUTER-SPECIFIC SOFTWARE UPDATES

CROSS-REFERENCE TO RELATED APPLICATION

This application is based on and claims the benefit of priority to U.S. Provisional Patent Application No. 61/246,008, entitled "Automated Deployment of Computer-Specific Software Updates" filed Sep. 25, 2009, the entire disclosure of which is hereby expressly incorporated herein by reference.

FIELD OF THE DISCLOSURE

The present disclosure relates generally to distributing computer updates on target hosts and, in particular, to automating the deployment of such updates to a process control system.

TECHNICAL BACKGROUND

Providers of operating systems, widely used applications, or specialized complex software packages, etc. often frequently release updates or fixes upon discovering problems such as potentially serious programming mistakes, security deficiencies, and other issues. For example, the vendor of an operating system may discover that a certain version of the operating system does not properly handle a particular event, or that a certain communication port may not be protected from unauthorized access. Rather than preparing a new release of the operating system that may span tens of thousands of files, the vendor typically prepares one or several objects such as dynamic-link libraries (DLLs) to replace or complement objects in the released version of the operating system. Similarly, a provider of a software solution, implemented as an application on a standard operating system, for example, may sometimes discover an issue only after the software solution has been released to one or several customers, and accordingly may wish to release a patch directly to the customers. The ever-increasing complexity of operating systems and specialized software solutions ensures that the number of updates required in a typical environment remains high.

Moreover, threats of electronic attacks have necessitated periodic updates of antivirus databases. These databases, as is generally known, often store data patterns which antivirus software may detect in network traffic and flag packets or frames carrying such patterns. Because new forms of malware (e.g., viruses, worms, trojan horses, spyware) are generated almost daily, antivirus databases require frequent updates for the corresponding antivirus software to remain effective. Further, as more and more hosts communicate over the Internet, the importance of cyber protection continues to increase.

In short, many software manufacturers today require or at least recommend regular updates to software products already released to customers. To simplify the process of delivering and installing such updates, some software manufacturers provide so-called Commercial Off-The-Shelf (COTS) deployment applications. For example, Microsoft Corporation has developed a Windows™ Server Update Service (WSUS). Generally speaking, WSUS includes a downloadable client component that runs on a host in a local network, contacts an external server component to receive updates, and installs updates received from the server component on multiple computers running a version of the Windows operating system. In this manner, WSUS eliminates the necessity to separately install updates on each individual computer.

Whereas users of personal computers can safely obtain updates directly from dedicated websites maintained by providers of the corresponding software (e.g., using the Windows Update application), corporations and other organizations that support relatively large local area networks typically roll out updates via one or several intermediate servers. Network administrators sometimes may wish to review the lists of available updates, determine when the available updates should be installed, and distribute the selected updates to hosts within the local network. Moreover, WSUS supports parent/child topologies so that a WSUS host on the corporate network, in the role of a parent, can receive one or several updates and provide these updates to one or several child WSUS hosts for subsequent distribution to user workstations.

Approval by network administrators is particularly relevant for those organizations or parts of organizations that run specialized software systems sensitive to changes in the operating system environment. The effect of updates on specific systems and applications running on hosts is frequently unknown. For example, a security update may adversely affect a communication channel or port used by the software system. Thus, in many cases, the manufacturer of the software system is better positioned to approve or reject an operating system update.

One example of such complex software system is a Windows-based DeltaV™ control system, sold by Emerson™ Process Management. Generally speaking, DeltaV is a digital automation system for managing and controlling industrial processes. As is generally known, many modern industrial processes are instrumented with controllers and various devices that automatically perform physical functions in a field according to a certain control strategy. Many control strategies are highly complex, and teams of engineers, operators, and technicians require comprehensive software solutions such as DeltaV to manage process plants that implement such control strategies. Today, plant operators in such diverse industries as life sciences, biotechnologies, petroleum, gas, chemicals, pulp and paper, and food and beverage run DeltaV in numerous process plants.

DeltaV includes multiple applications stored within and executed by different hosts such as workstations located at diverse places within a process plant. If desired, DeltaV applications also may be networked across several facilities or process control plants. For example, a configuration application, which resides in one or more operator workstations, enables users to create or change process control modules and download these process control modules via a data highway to dedicated distributed controllers. As another example, viewing applications, which may be run on one or more operator workstations, receive data from a controller application via a data highway and display this data to process control system designers, operators, or users using the user interfaces.

Because a process control system such as DeltaV may be compatible with a standard operating system (OS) such as Windows, for example, it may be appropriate to install some of the OS updates on workstations running the process control system. However, some of the other OS updates may be unnecessary for proper operation of the process control system, while yet others are potentially harmful to the process control system. Further, the antivirus updates may similarly fall into several categories according to the requirements of the process control system. Still further, the manufacturer may sometimes wish to update the process control system workstations at a plant operator site. For these and other reasons, hosts running the process control system may require a very specific combination of software updates. However, COTS applications such as WSUS are not set up for deployment of updates to specialized software applications such as process control systems. With respect to OS updates, operators of process control systems at best can use a COTS application with manual approval or rejection of updates.

Moreover, because process control system workstations typically define only a portion of a larger network of a plant operator, the updates suitable for such workstations may not be the same as the updates installed on hosts operating in the plant operator's network but unrelated to the process control system. Network administrators thus may be required to keep track of different requirements for different hosts in the local network even though each host has the same version of the operating system. In other organizations, a process control system operator may be responsible for network administration of the process control network that includes dedicated workstations, while corporate network administrators may be responsible for other portions of the network. However, this division of responsibilities may not be practical. For example, WSUS updates to process control system workstations typically proceed through a WSUS host in the corporate network. The WSUS host may notify a corporate network administrator that certain hosts (i.e., process control system workstations) have not been properly upgraded, and process control system operators subsequently may have to explain why some of the upgrades have been omitted in the process control network.

These and other factors lead to loss of productivity, lack of clarity, and increased complexity of network administration. As a more trivial matter, corporate or local network administrators may make mistakes in selecting or applying software updates, or may not always treat software updates as a high priority task. As a result, many important updates remain uninstalled for long periods of time. Meanwhile, process control systems remain exposed to threats to security or system integrity, as is often the case with updates that fix system crashes. As operators move away from proprietary technology to more open and interoperable standards and systems, the threat of cyber attacks in the process control industry becomes more relevant. Further, in many cases, updates unrelated to security threats are equally important inasmuch as such updates address issues related to system stability and reliability.

SUMMARY

A software update system automatically deploys approved software updates or metadata related to such updates to a customer system so that the approved software updates can be safely installed on one or several target computers without a manual approval by an operator of the customer system. The software update system may include a client application downloadable to a host operating in the customer system, and a server application operating outside the customer system to manage metadata and, in some cases, software updates, determine which software updates should be installed in the customer system, and deliver the appropriate metadata and/or the software updates to the client application.

In some embodiments, the customer system includes an intermediate network layer (e.g., a so-called "demilitarized zone" or DMZ) exposed to a larger network (e.g., the Internet), and a specialized network layer to execute applications specific to business activities of the customer operating the customer system. The client application in at least some of these embodiments includes a front-end module operating in the DMZ and a back-end module operating in the specialized network layer. The front-end module communicates with the server application to request information regarding the available software updates and/or the actual software updates as downloadable objects. In some situations, the front-end module communicates with other applications such as an antivirus update application or an upstream OS-specific deployment application, running on the same server (or another server in the DMZ) to specify which antivirus or OS software updates have been approved for installation in the specialized network layer. The back-end module in turn communicates with the front-end module to retrieve the software updates and the metadata from the DMZ, decrypt and decompress the retrieved software updates and the metadata if required, and initiate automatic installation of the software updates in the specialized network layer. In an embodiment, the back-end module triggers the automatic installation by issuing appropriate commands to a COTS deployment application running in the specialized network layer.

In some embodiments, the specialized network layer is a process control layer in which a software-based process control system runs on one or several operator workstations to manage and control a process plant having one or several controllers and multiple field devices that perform respective physical steps to carry out a process control strategy of the process plant. The manufacturer or vendor of the process control system may manage the software update system to generate and classify updates specific to the process control system, and identify which of the updates published by the respective manufactures of the antivirus software and the operating system are suitable for various versions of the process control system. Accordingly, in response to a query from the client application, the server application may generate a report of potential updates to the process control system, the antivirus database, and the operating system, and transmit the report to the client application. In some embodiments, the client application applies the report to a COTS deployment application such as WSUS to trigger a download and/or installation of updates to the operating system.

In some embodiments, the server application or the client application applies a wrapper to updates to the process control system so that a COTS deployment application for the corresponding operating system can install these updates on behalf of the manufacturer of the process control system. To this end, the server application or the client application may apply an application programming interface (API) provided by the manufacturer of the COTS. The wrapper may specify one or multiple locations to which the wrapper update should be distributed as well as other installation parameters. If desired, the wrapper may include a digital signature of the manufacturer of the process control system to assure security.

In some embodiments, the client application is configurable to query the server application according to a certain schedule, in response to a user command, or based on any other specified principle. The client application may report the version of the software running in the specialized network layer (e.g., the process control network) to the server application, and the server application may identify which updates, if any, should be downloaded to the customer system. In other embodiments, the client application reports the identity of the customer to the server application, and the server application identifies the version of the specialized software running in the customer system based on the customer identity.

DETAILED DESCRIPTION OF THE DRAWINGS

FIG. 1 schematically illustrates a communication system that includes a customer system with a process control layer to manage the operation of a process plant, a process control system vendor layer operated by a vendor of the process control system, and a software update system distributed among the customer system and the process control system vendor layer to automatically deploy software updates to the customer system.

DETAILED DESCRIPTION

Figure 1:
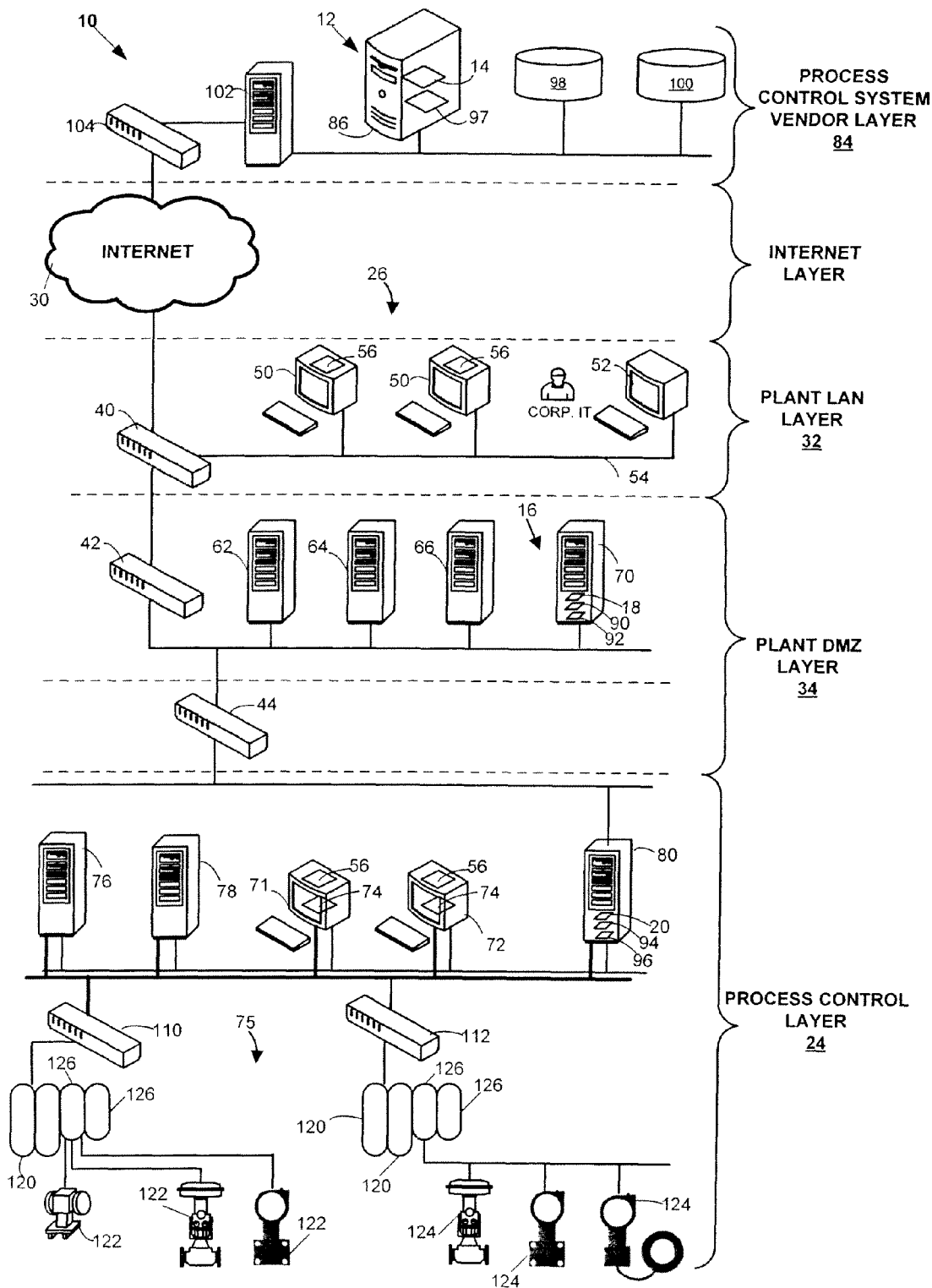

FIG. 1 illustrates a communication system 10 in which a software update system 12 that includes a server application 14 and a client application 16, having a front-end module 18 and a back-end module 20, securely and efficiently deploys software updates to several hosts operating in a process control layer 24 of a customer system 26. The software update system 12 is also referred to herein as Software Update Delivery Service (SUDS), and the applications 14 and 16 are referred to as the SUDS server and the SUDS client, respectively. A plant operator such as a company running a chemical plant, an oil refinery, or a water treatment facility may separate the process control layer 24 from the Internet 30 by a plant LAN layer 32 and a plant "demilitarized zone" (DMZ) layer 34. In the example communication system 10, the plant LAN layer 32 is connected to the Internet 30 via a router/firewall 40, and the plant DMZ layer 34 is connected to the plant LAN layer 32 via a router/firewall 42. Further, a switch 44 connects the process control layer 24 to the DMZ layer 34.

The plant LAN layer 32 includes several workstations 50 and 52 connected to a communication link 54 consistent with any suitable communication standard such as the IEEE 802.3 Ethernet, for example. As is typical, the workstations 50 and 52 share an operating system 56 having networking capabilities such as, for example, Windows™ manufactured by the Microsoft Corporation. Users in various organizational roles operate the workstations 50 to carry out day-to-day activities of the plant operator. For example, the plant operator may employ engineers, accountants, marketing staff, and other personnel. Users who operate the workstations 50 may have a certain set of permissions that typically do not permit these users to access the process control layer 24. On the other hand, these users have a mostly unrestricted access to hosts on the Internet 30 and, as a result, a relatively high risk of exposure to viruses, malware, hijacking attempts, and other cyber threats.

To protect computer hosts disposed at or below the plant LAN layer 32, network administrators (also referred to as IT personnel) may operate the workstation 52 to monitor traffic on the communication link 54, configure firewall applications running on the router/firewall 40 or locally on the workstations 50 and 52, assign permissions to various users, identify and eliminate malicious software in the plant LAN layer 32, etc. Additionally, network administrators may install operating system and antivirus updates on the workstations 50 and 52, typically upon receiving corresponding notifications from the respective vendors of the operating system 56 and the antivirus software.

The plant DMZ layer 34 may include several servers such as an anti-virus server 62, a data server 64, and a historian server 66. As is known, a DMZ layer generally provides additional security to a local network by limiting direct exposure to a larger network such as the Internet 30 to only several hosts (i.e., the servers 62-66, a DNS server (not shown), a web server (not shown), etc.). Additionally, an upstream update server 70 may execute the front-end module 18 of the client application 16 to support automated deployment of software updates and/or propagation of metadata related to software updates, as discussed in more detail below. It will be noted that the DMZ layer 34 in general may be any intermediate network layer that improves the security of the customer system 26 by directing all incoming and outgoing internet traffic via one or several hosts.

With continued reference to FIG. 1, the process control layer 24 may include several operator workstations 71 and 72, each running the operating system 56 and a process control system 74 such as DeltaV, for example, for controlling a process plant 75. The process control layer 24 may also include several servers such as an application server 76 and a configuration server 78. Further, a downstream server 80 in this example configuration executes a back-end module 20 of the client application 16. Because the downstream server 80 performs the actual deployment of software updates to hosts in the process control layer 24, the downstream server 80 may also be referred to as an update server. In some embodiments, the downstream server 80 is configured to operate as a gateway only, and does not run the process control system 74.

In operation, the front end 18 of the client application 16 is activated in response to a command from a user interface or according to a pre-configured event such as an expiration of a timer, for example. Upon activation, the client application 16 requests a list of available updates to the process control system 74 and the operating system 56 from the server application 12 that may run in a process control system vendor layer 84 on a vendor update server 86, for example. In response to the request from the client application 16, the server application 12 determines whether software updates are available, and which of the available updates are compatible with the respective versions of process control system 74 and the operating system 56 in the customer system 26. The server application 12 then transmits a lists of available updates to the client application 16. Next, the client application 16 checks whether any of the available listed updates have not yet been downloaded to the file system in the plant DMZ layer 34. If the client application 16 determines that software updates are needed, the client application 16 formats and transmits a corresponding request to the server application 14.

In response to the request from the client application 16, the server application 14 transmits appropriate software updates and/or metadata related to the software updates to the client application 16, so that the software and/or the metadata may be stored in a certain location in the DMZ layer 34. The front-end module 18 then works with the back-end module 20 to securely deliver the software updates and the metadata to the downstream server 80 and, ultimately, to various hosts in the process control layer 24 (e.g., workstations 71 and 72). Moreover, as discussed in more detail, the client application 16 in some embodiments automatically configures one or several COTS applications such as WSUS to obtain software updates from the respective vendor or manufacturer in accordance with the list of approved software updates received from the server application 14.

Still referring to FIG. 1, the upstream update server 70 may run an upstream WSUS 90 and an antivirus soliciting application 92 such as the Symantec Live Update Administrator (LUA) in addition to the front-end module 18 of the client application 16. Further, the downstream server 80 may run a downstream WSUS 94 and an antivirus deployment application 96 such as the Symantec End Point Protection Manager (SEPM), for example. The antivirus soliciting application 92 solicits antivirus updates from the corresponding manufacturer (e.g., Symantec), and generally may reside on any host in the DMZ layer 34 or the plant LAN layer 32. On the other hand, the antivirus deployment application 96 deploys antivirus updates retrieved by the antivirus soliciting application 92 to hosts in the process control layer 24. Similarly, the upstream WSUS 90 and the downstream WSUS 94 implement a parent/child topology. In particular, the upstream WSUS 90 solicits software updates from the OS manufacturer (e.g., Microsoft) and the downstream WSUS 94 is configured to distribute updates to hosts in the process control layer 24. It will be further noted that the process control layer 24 may be coupled to the DMZ layer 34 via the downstream (or update) server 80, thereby providing another level of protection to the process plant 75.

In some embodiments, the back-end module 20 retrieves updates from a location in the DMZ layer 34 following a query of the front-end module 18. The back-end module 20 may be a relatively "light-weight" application that performs a file-transfer function, decompresses the retrieved objects as necessary, and applies a decryption algorithm to verify the integrity and security of the retrieved objects. To this end, the back-end module 20 may apply any suitable techniques known in the art (e.g., applying digital certificates). The back-end module 20 may then convert objects specific to the process control system 75 to a format recognized by the downstream WSUS 94 or another suitable COTS deployment application, i.e., "wrap" the objects, and provide these converted or wrapped objects to the downstream WSUS 94 for distribution. If desired, the back-end module 20 may further communicate with the downstream WSUS 94 to specify that the wrapped objects have been approved for distribution, thereby triggering a subsequent (and, if necessary, immediate) distribution of the converted objects through the process control layer 24. For example, Microsoft Corporation provides an API for wrapping objects unrelated to the Windows operating system to make these objects compatible with deployment via a WSUS application. In some embodiments, objects may be wrapped at the process control vendor layer 84.

In effect, the back-end module 20 in these embodiments programmatically injects software objects and approval data into the downstream WSUS 94 for distribution and installation, and thus carries out an indirect deployment of software updates. For this reason, the back-end module 20 need not support the complex logic of actual distribution or installation of software updates, and may instead operate as an add-on to the WSUS 94. In alternative embodiments, however, it is possible to include the distribution and installation logic in the back-end module 20, thus making the back-end module 20 a full-blown deployment application.

As indicated above, the software update system 12 can be configured to automatically deploy (in a direct and/or indirect manner) updates related to the process control system 74, the operating system 56, the antivirus software used in the customer system 26 and, if desired, other software products installed or installable in the process control layer 24. In this manner, the manufacturer or vendor of the process control system 74 can simplify the process of deploying updates, as well as ensure that the process control system 74 continues to operate properly after each update has been installed. Of course, the vendor of the process control system 74 may operate a single update server such as the vendor update server 86 to interact with multiple customer systems. Thus, the software update system 12 can include one server application 14 and multiple client applications 16. To simplify user experience, the vendor update server 86 may store a copy of the client application 16 as a downloadable and easily installable object 97. If desired, the object 97 may be compressed. It will be further appreciated that in order to properly deploy updates, the software update system 12 preferably includes, or cooperates with, one or several databases storing data related to each customer, each version of the process control system 74 being used, and other information necessary to roll out a customer-specific software update.

As illustrated in FIG. 1, the vendor update server 86 is communicatively coupled to a configuration repository 98 that stores information related to the configuration of customer systems such as the customer system 26. For each customer system, the configuration repository 98 may store an identifier of the version of the process control system 74 installed in the process control layer 24, an identifier of the version of the operating system 56, the date of the last update of the antivirus software or database in the process control system 74, etc.

The vendor update server 86 may also be connected to an update repository 100 in which the vendor stores software objects for each software update of the process control system 74. Because each version of the process control system 74 typically require different software updates, the update repository 100 accordingly may maintain version-specific lists of updates. The update repository 100 may also store metadata related to both updates to the process control system 74 and updates to software components from other vendors (e.g., the operating system 56). Each of the update repositories 98 and 100 may be implemented in any desired manner such as in a separate data server, in a relational database stored in the file system of the vendor update server 86, as a collection of files or records stored on a computer-readable medium such as a Compact Disc (CD) or a Digital Versatile Disc (DVD). If desired, the update repositories 98 and 100 may be implemented as one integral repository.

Generally speaking, metadata is electronic information that a deployment application (such as the downstream WSUS 94) uses to target proper computers or other nodes for installation. For example, metadata used in the communication system 10 can include identity of the process control system used by the customer, e.g., a unique number assigned by the vendor of the process control system 74. Depending on the embodiment, the identity can be assigned at the level of the process control layer 24 or the customer system 26, for example. The downstream WSUS 94 may compare corresponding locally stored parameters at the downstream server 80 to verify that a certain software update has been properly routed to the downstream WSUS 94. As other examples, metadata may include names or identifiers of target computers, names of software objects included in an update, update behavior (e.g., reboot requirement, service disruption), file size, description of the update, installation instructions.

It is possible for the update repository 100 to store metadata related to updates both for the process control system 74 and other software, whereas actual software objects in the update repository 100 typically correspond only to the process control system 74. In other embodiments, the update repository 100 may include software objects for other software products. In these embodiments, the vendor of the process control system 74 in effect becomes a single direct source of all software updates. However, it will be noted that although some customers may find this arrangement convenient, other customers may prefer not to expose the network structure of the organization (e.g., the plant LAN layer 32 and the DMZ layer 34) to the vendor of specialized software such as the process control system 74.

To further improve the security of the data managed in the process control system vendor layer 84, a secure internet-facing host 102 may be disposed between a router 104 connected to the Internet 30 and the vendor update server 86 and the data servers storing repositories 98 and 100. A potential intruder would thus find it more difficult to access information regarding private facilities such as the customer system 26 stored in the repositories 98 and 100.

With continued reference to FIG. 1, the process control layer 24 includes a primary switch 110 and a secondary switch 112 through which the workstations 71 and 72 may access the process plant 75. As is typical, the process plant 75 implements distributed process control using one or more controllers 120, each connected to one or more field devices 122 or smart devices 124 via input/output (I/O) devices or cards 126 which may be, for example, Fieldbus interfaces, Profibus interfaces, HART interfaces, standard 4-20 mA interfaces, etc. The field devices 122 and 124 may be any types of devices that perform respective physical functions in the process plant 75, e.g., sensors, valves, pumps, transmitters, positioners.

Figure 2:
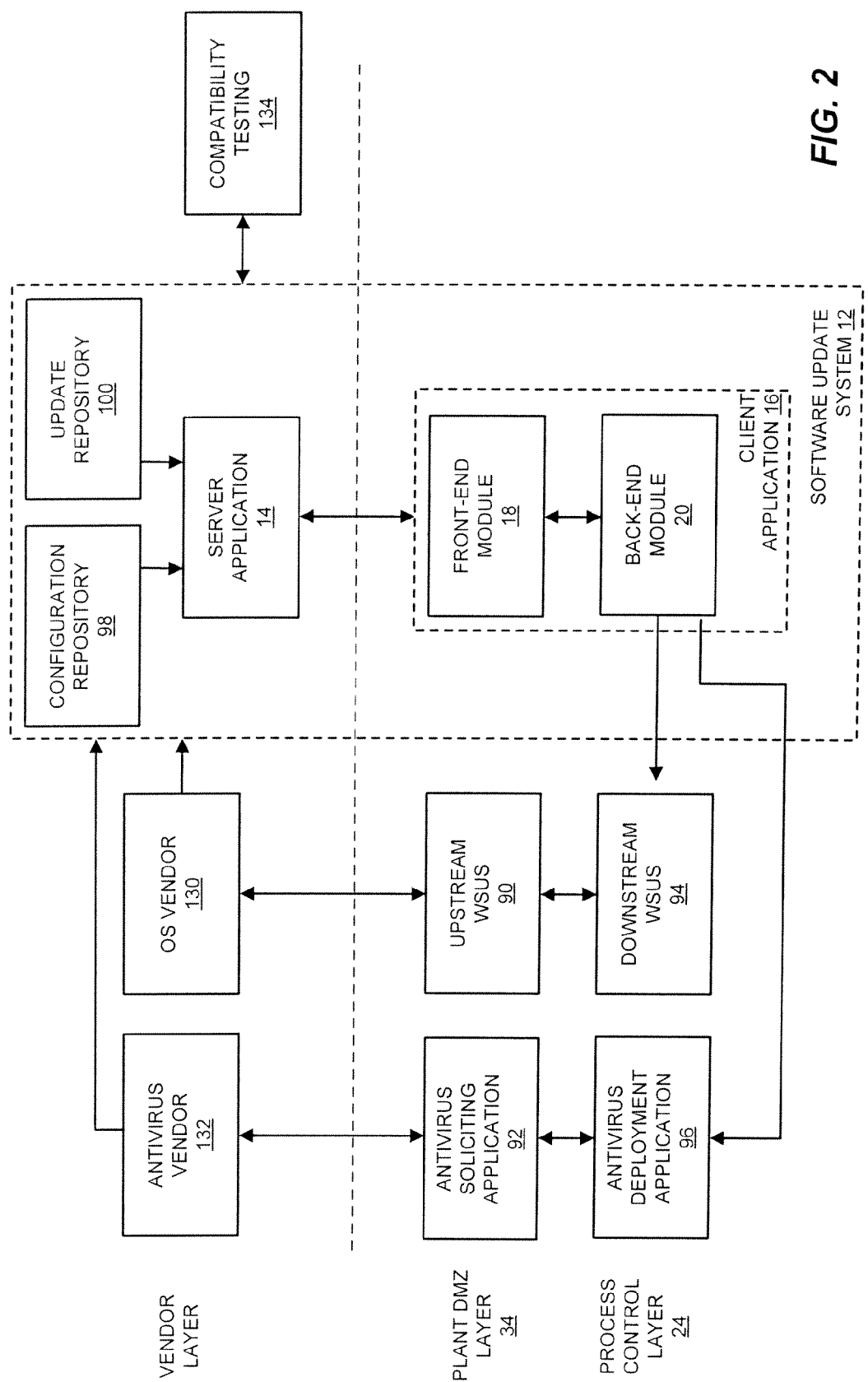
FIG. 2 is a block diagram of some of the components of the communication system illustrated in FIG. 1.

For the purposes of clarity, FIG. 2 illustrates some of the components discussed above in a block diagram. The arrows connecting various blocks in FIG. 2 need not correspond to direct connections, and are provided only to illustrate how information propagates between the software update system 12, the WSUS components 90 and 94, the antivirus application components 92 and 96, a vendor 130 of the operating system 56 and a vendor 132 of the antivirus software used in the customer system 26. In general, the software update system 12 may interact with any number of software manufactures or vendors. Also, the client application 16 need not necessarily include two separate modules as is the case in the example embodiments illustrated in FIGS. 1 and 2. For example, some customer systems may not implement a secure network layer (such as the DMZ layer 34) at all, and the client application 16 in these embodiments could include a single module with the combined functionality of the modules 18 and 20 discussed above.

Referring to FIG. 2, the vendors 130 and 132 may supply software updates, metadata, or both to the software update system 12. For reasons discussed above, a customer may prefer to retrieve software updates from the corresponding vendors rather than from a single entity. However, the vendor of specialized software may to test and approve interactions between the specialized software and the updates offered by the vendors 130 and 132, for example. The necessary testing may be conducted manually or automatically using a compatibility testing module 134. Of course, the vendor of specialized software may also identify which of the software updates from the vendors 130 and 132 should be approved in any suitable manner. In those situations where the server application 14 does not directly provide software updates on behalf of the vendors 130 and 132, the vendor of the specialized software provides a list of approved updates and, optionally, metadata associated with the approved updates, which the client application 16 can use to configure the downstream WSUS 94 and the antivirus deployment application 96, for example.

Figure 3:
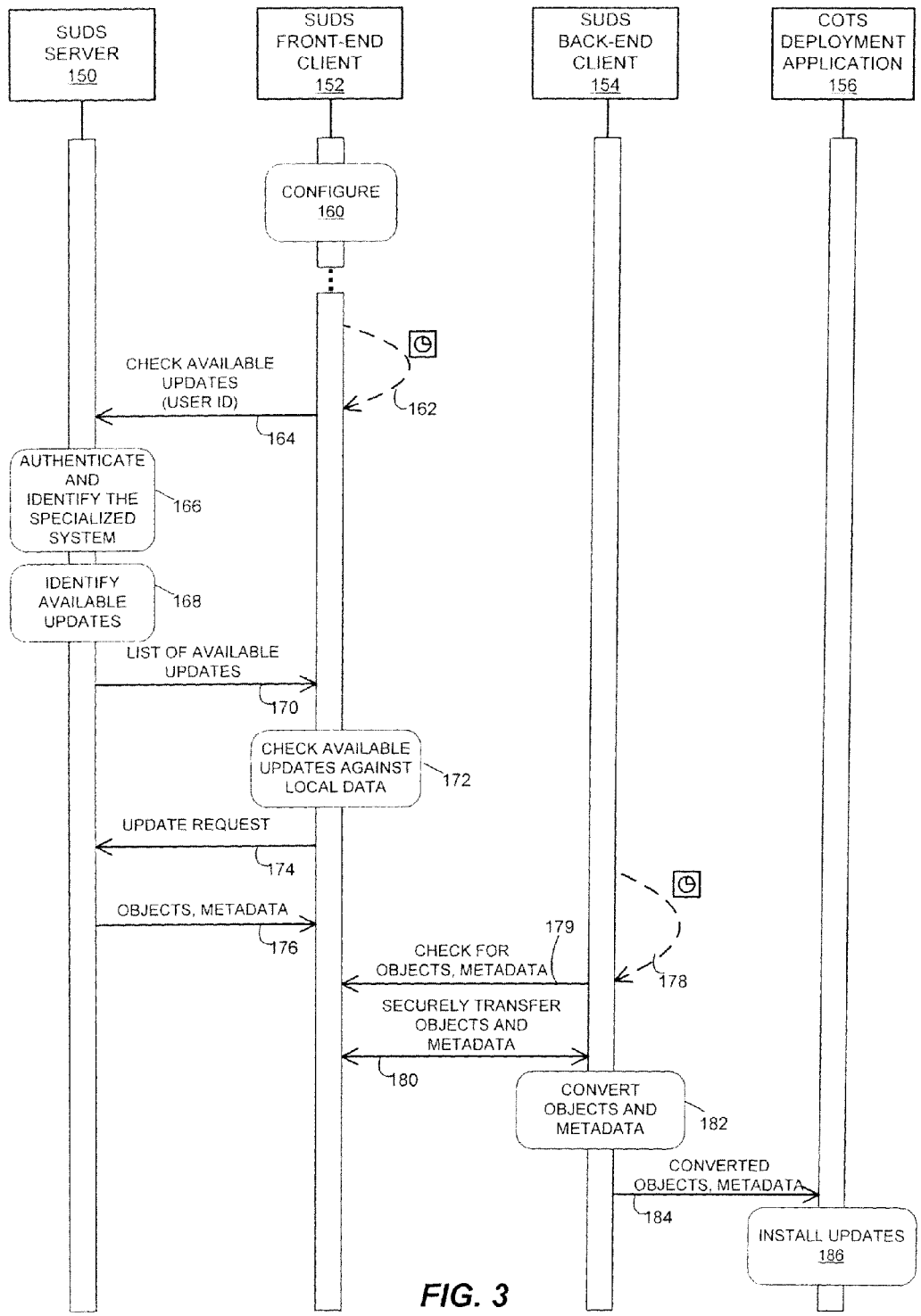
FIG. 3 is a message sequence diagram that illustrates one example of automatically deploying software updates in the communication system of FIG. 1.
Figure 4:
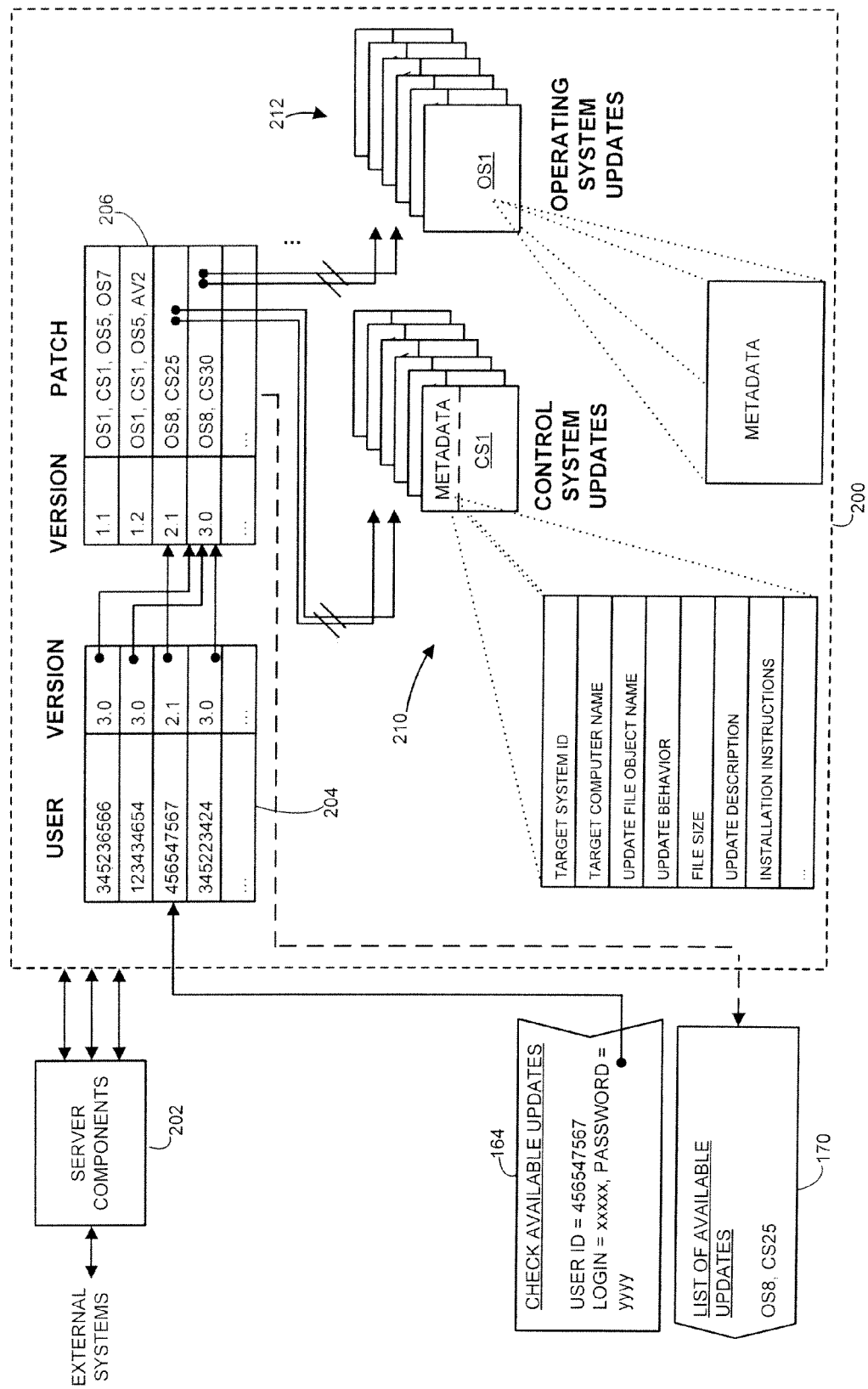
FIG. 4 is a block diagram that illustrates one example of interaction of messages and data structures supported by the software update system illustrated in FIG. 1.
Figure 5:
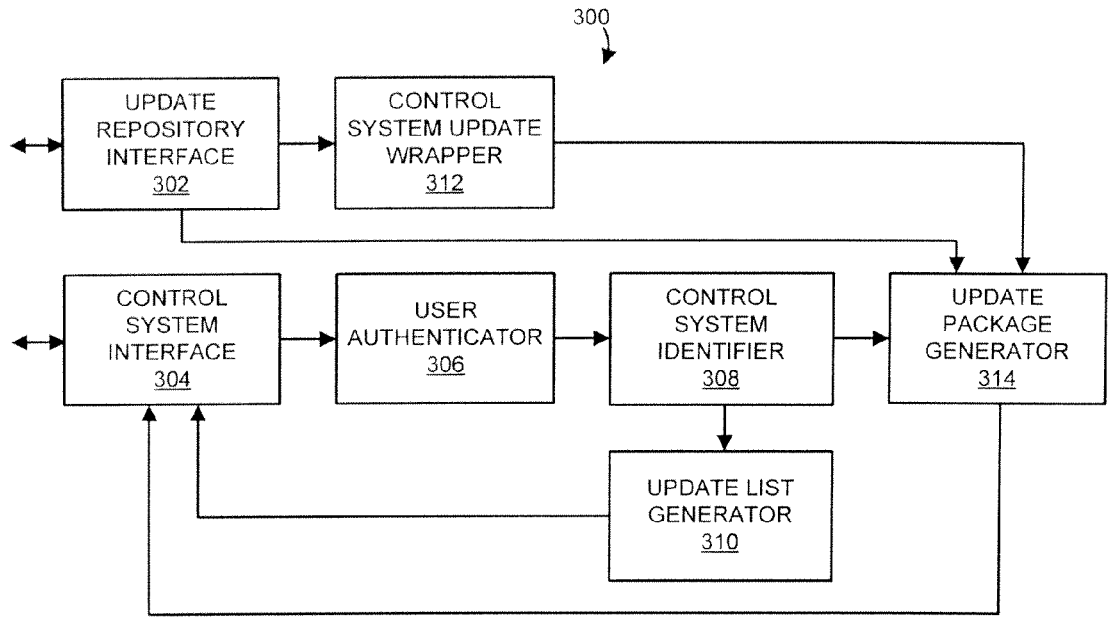
FIG. 5 is a block diagram of a server application that operates as a portion of the software update system of FIG. 1.
Figure 6:
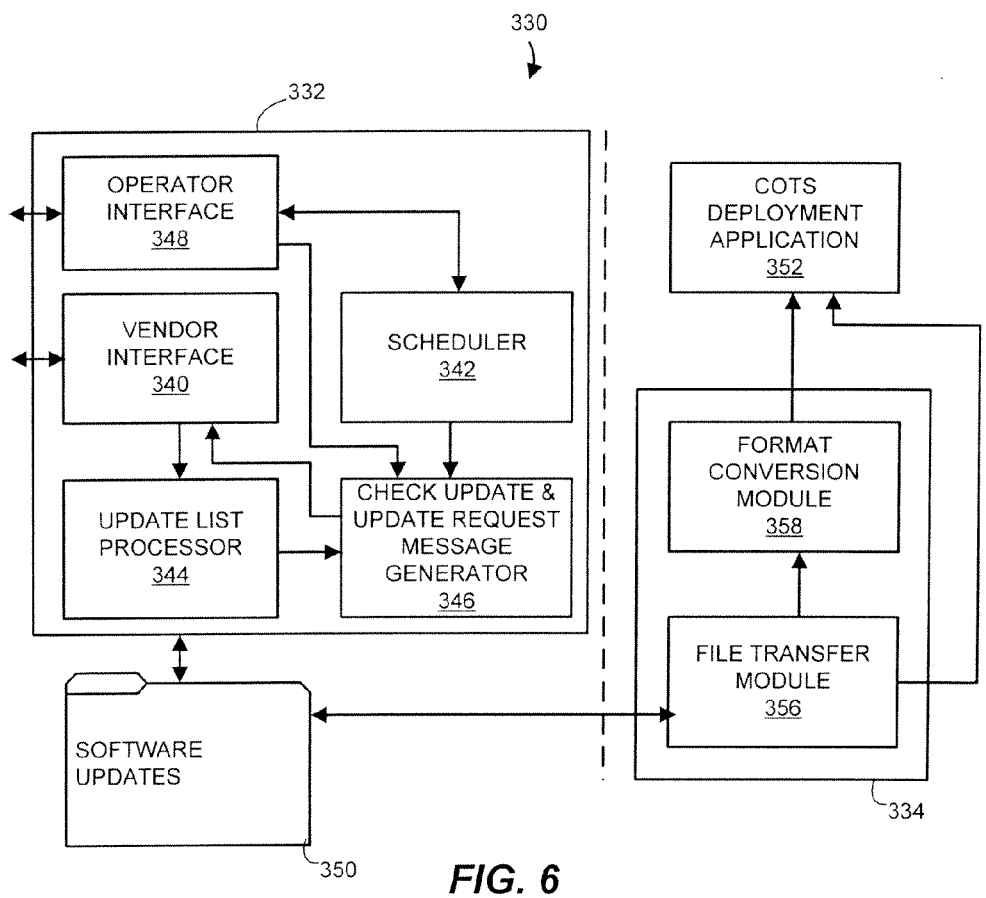
FIG. 6 is a block diagram of a client application that operates as a portion of the software update system of FIG. 1.

Next, an example exchange of messages between several components that operate to automatically deploy software updates is illustrated in FIG. 3. Further, to better explain how a system for automatically deploying software updates (such as the software update system 12) manages updates and metadata from one or several software vendors, FIG. 4 schematically depicts interactions between several messages and data structures at the process control system vendor layer 84 (see FIG. 1). FIGS. 5 and 6 then illustrate block diagrams of example server and client applications, respectively, that may operate in the communication system illustrated in FIG. 1.

Referring to FIG. 3, a SUDS server 150, a SUDS front-end client 152, a SUDS back-end client 154, and a COTS deployment application 156 operate in different portions of the corresponding communication system to automatically and securely deploy software updates to a customer system. For example, the components 150-154 may operate in the communication system 10 of FIG. 1 to deploy updates to the customer system 26, and the messaging illustrated in FIG. 3 accordingly may be implemented by the components 14, 18, 20, and 94. As a security measure, the SUDS front-end client 152 may run in a DMZ of the corresponding computer network, and the SUDS back-end client 154 may run in a specialized network layer such as a process control layer (or on a server communicatively coupled to the specialized network layer). The SUDS server 150 may run in a computer network of a vendor of the specialized software system installed in the customer system. In general, however, it is possible for the components 150-154 to operate in a communication network having any suitable topology, any number of network layers, etc. Further, the SUDS server 150 may interact with multiple instances of SUDS front-end clients 152 operating in respective customer systems. Still further, the components 150-154 are not limited to a network that includes a process control layer for controlling a process plant. Thus, some or all of the components 150-154 may deploy updates in any computer system, although it is contemplated that the components 150-154 are particularly helpful in those systems that run specialized software applications on at least some of the computer hosts.

In block 160, the SUDS front-end client 152 may be configured to initiate software updates to a specialized software system installed in the customer system and to other software systems (e.g., the OS, the antivirus software) according to any desired scheme which a corresponding administrator could defined in view of technical and business factors. For example, the SUDS front-end client 152 may be scheduled to "wake up" weekly to query the SUDS server 150 for updates. In response to a timer expiration event 162, the SUDS front-end client 152 formats and transmits a Check for Updates message 164 to the SUDS server 150 to request a list of available updates. If desired, the SUDS front-end client 152 can be configured to display a dialogue screen at one of the workstations 71 or 72 after receiving the timer expiration event 162 but prior to transmitting the message 164 to solicit an explicit confirmation from a human operator.

The message 164 may include authentication information such as a login and a password to prevent unauthorized users from contacting the SUDS server 150. In some embodiments, the message 164 also includes an identity of an operator of the customer system (e.g., "ACME Corporation") so that the SUDS server 150 can identify versions of various software systems currently installed in the customer system. In other embodiments, the message 164 identifies a version of a specialized software installed in the customer system (e.g., "DeltaV version=9.0"). If desired, the message 164 in these embodiments can also identify the version of the operating system 56 (e.g., "OS version=Windows XP") along with the patches already installed in the customer system, as well as the version of the antivirus database and any other relevant software applications. To this end, the SUDS front-end client 152 may check local configuration data when formatting the message 164. In yet another embodiments, the message 164 may include a unique identity of the customer system assigned by the vendor that operates the SUDS server 150.

In response to receiving the message 164, the SUDS server 150 may identify in block 166 which versions of relevant software are installed in the customer system from which the message 164 has been received. As discussed above, the message 164 in some embodiments already specifies most or all of the information which the SUDS server 150 retrieves in block 166. Next, in block 168, the SUDS server 150 identifies which updates related to some or all of the specialized software system (e.g., a process control system), operating system, antivirus software, etc. are recommended and/or have been approved for the customer system. Several examples of operation of the SUDS server 150 in blocks 166 and 168 is discussed in more detail with respect to FIG. 4.

With continued reference to FIG. 3, the SUDS server 150 may generate a List of Available Updates message 170 and transmit this message to the SUDS front-end client 152. In some embodiments, the message 170 may be formatted according to XML rules. The SUDS front-end client 152 may then compare the list of available updates to a local repository to determine which of the listed updates, if any, are not yet present in a network or sub-network in which the SUDS front-end client 152 operates (block 172). As an example, the SUDS server 150 may indicate that several OS patches should be downloaded, and the SUDS front-end client 152 may check whether a WSUS application running in the same DMZ has already retrieved these OS updates and stored the updates in a local folder. Similarly, the SUDS front-end client 152 may check whether updates for the specialized computer system have been previously downloaded. Alternatively, the SUDS server 150 may keep track of updates that have been previously delivered to each SUDS front-end client 152.

The SUDS front-end client 152 may then format an Update Request message 174 that lists which updates are being requested for download. The SUDS server 150 may parse the message 174 and prepare update data including software objects and/or metadata, and forward the update data to the SUDS front-end client 152 in a message 176. In some embodiments, the update data includes actual software objects for patching, upgrading, and otherwise modifying the specialized software system with whose vendor the SUDS server 150 is associated. For example, the message 176 may include a DLL for addressing a recently discovered flaw in the process control system which the customer system runs in the process control layer. The update data may also include metadata related to such one or several objects. However, for reasons discussed above, the message 176 need not necessarily include actual software objects for patching an operating system, or data objects for upgrading an antivirus database. Instead, the message 176 may include only the metadata related to objects "non-native" to the SUDS server 150 or, alternatively, only the identity of these objects.

In response to a timer expiration event 178, the SUDS back-end client 154 transmits a Check for Objects and Metadata message 179 to the SUDS front-end client 152. If the update data has been received and stored in a certain location accessible to the SUDS back-end client 154, the SUDS front-end client 152 notifies the SUDS back-end client 154 that updates are available and initiates a transfer of the update data to an update server (message 180), from which the update data can be installed in a sub-network serviced by the SUDS client applications 152 and 154 (e.g., a process control network). The SUDS back-end client 154 may decompress and decrypt the update files as necessary, as well as apply wrappers to make update objects compatible with the COTS deployment application 156 (block 182). A message 184 notifies the COTS deployment application 156 that one or several wrapped objects are available, and the COTS deployment application 156 installs the updates in block 186.

In some case, the message 184 may include metadata and/or approval information for updates to an application for which the COTS deployment application 156 is provided. For example, the COTS deployment application 156 may be a WSUS application, and the message 184 may specify which Windows updates have been approved as compatible with the current version of the specialized software system. Referring back to FIGS. 1 and 2, it will be appreciated that the techniques discussed with reference to FIGS. 1-3 eliminate the need to secure manual approval of updates specific to a specialized network layer form a corporate network administrator. In particular, the back-end module 20 effectively configures the downstream WSUS 94 to request and obtain from the upstream WSUS 90 only those OS-specific updates that have been approved by the vendor of the process control system 74. Irrespective of which updates are distributed to other portions of the network in the customer system 26, the downstream WSUS 94 reports compliance to the upstream WSUS 90 as long as the approved updates are properly installed in the process control layer 24. Thus, a corporate network administrator monitoring software updates will not see a false alert reporting lack of compliance in the process control layer 24, even though the updates actually applied in the process control layer 24 may be different from the updates applied in the plant LAN layer 32, for example.

Referring again to FIG. 3, the SUDS front-end client 152 in other embodiments may transmit the message 164 only once in a relatively long period of time, e.g., upon installation of a new version of the specialized software system. The message 164 may include, for example, the authentication information of the SUDS front-end client 152, the identifier of the version of the specialized software system, and an indication of a method and frequency for automatic notification regarding new software updates. In these embodiments, the SUDS server 150 may maintain a list of SUDS clients that wish to be notified automatically when new updates become available, check the list once new updates are approved, and generate the respective messages 170 for the SUDS front-end clients 152 if appropriate. If desired, the SUDS server 150 may also notify customer systems whose credentials have not yet been provided to the SUDS server 150. In other words, the message 164 may be optional in some embodiments as the SUDS server 150 (or the server application 14 discussed with reference to FIGS. 1 and 2) can support vendor-initiated software updates as well as client-initiated software updates.

Now referring to FIG. 4, a vendor of a process control system software system may maintain a repository 200 that stores configuration data related to customers running various versions of the process control system, update related to the specialized software system, and data related to software updates to other software products or systems which the vendor's customers may use. The repository 200 may be data stored on a computer-readable medium. As one example, the repository 200 may be implemented as the configuration repository 98 and the update repository 100 illustrated in FIGS. 1 and 2. As illustrated in FIG. 4, the repository 200 may interact with software or hardware components 202 which may be, for example, the components of the server application 14 or the SUDS server 150.

The repository 200 includes a user table 204, an update table 206, control system updates 210, and operating system updates 212. For the purposes of clarity, the repository 200 is illustrated without antivirus update objects, although in general it is possible for the repository 200 to include related to any number of software products. In this example embodiment, the table 204 specifies which version of the process control system a particular customer is currently using, and the table 206 lists updates approved for each version. Thus, if the message 164 identifies a customer with the user identity "456547567," the table 204 indicates that version 2.1 of the process control system is installed at this customer's site, and the table 206 lists an operating system update identifier OS8 and a process control system update identifier CS25. In this example, the control system updates 210 are stored as software objects along with the corresponding metadata. The software objects may be DLLs, data files, or groups of files installable in one or several target directories. In some embodiments, the control system updates 210 further include data required to generate a wrapper for use by a COTS deployment application such as the downstream WSUS 94 or the COTS deployment application 156. On the other hand, the operating system update data 212 includes only metadata or, if desired, only the identity of the software update objects (e.g., OS1, OS5, OS8). In the example illustrated in FIG. 4, the update OS8, including the software objects and the metadata, and the update CS25, including only metadata, are communicated to the client application in the message 170.

FIG. 5 is a block diagram of a server application 300 that may operate in the communication system 10 or as the SUDS server 150, for example. The server application 300 includes an update repository interface 302 through which the server application 300 may interact with a repository of configuration and update data such as the repository 200. More specifically, the update repository interface 302 may be a set of APIs for searching through various tables of the repository 200, retrieving update objects and/or identity of update objects, etc. Further, the server application 300 includes a control system interface 304 to receive messages from a corresponding client application running in a customer facility such as the customer system 26, for example. Referring back to FIGS. 1 and 2, the control system interface 304 may support messaging to and from the client application 16. In an embodiment, the control system interface 304 includes an HTTPS port on a computer host coupled to the Internet, and one or several Secure Socket Layer (SSL) certificates to verify the integrity of incoming messages.

The server application 300 also includes a user authenticator 306, implemented using the techniques known in the art, to verify login and password information of customers requesting software updates. A control system identifier 308 may query the local repository 200, for example, to determine which software the customer entity is currently using. If desired, the control system identifier 308 may also check what type and version of the operating system and/or the antivirus database the customer is currently using.

Further, an update list generator 310 may be coupled to the control system interface 304 to report to the corresponding client application which software updates have been approved. Still further, the server application 300 includes a control system update wrapper 312 to optionally apply wrappers to process control system objects to make these objects compatible with a COTS deployment service. Alternatively, the control system update wrapper 312 may reside in the corresponding client application. Still further, an update package generator 314 may generate software update packages for client applications including some or all of software objects, metadata, and software object identifiers.

Now referring to FIG. 6, a client application 330 includes a front-end application 332 and a back-end application 334. In an embodiment, the client application 16, discussed above with reference to FIGS. 1 and 2, implements the architecture of the client application 330. The front-end application 332 includes a vendor interface 340 to communicate with an application running in the computer network of the process control vendor. For example, the front-end application 332 may communicate with the server application 14. The front-end application 332 further includes a scheduler 342 to implement a scheme according to which the client application 330 queries the corresponding server application regarding software updates. Further, the front-end application 332 includes an update list processor 344 that checks which of the reported available updates are missing from the DMZ or other type of network in which the front-end application 332 is running, and a message generator 346 to format messages such as the messages 164 and 174 illustrated in FIG. 3.

Further, the client application 330 includes an operator interface 348 to receive user commands such as a command to query the server application regarding the available updates or a command to initiate a download of the available software updates to the DMZ, display information regarding the available software updates, display reports listing previous updates, etc.

An update folder 350 may be disposed in the file system of the computer host in which the front-end application 332 is running, in a shared network location such as the file system of another host in the DMZ, or in any other location accessible to both the front-end application 332 and the back-end application 334. The update list processor 344 may store software objects and metadata received from the server application in the update folder 350 for subsequent deployment and installation by the back-end application 334 and, in at least some of the embodiments, a COTS deployment application 352. The back-end application 334 may retrieve, decrypt, and unzip files in the update folder 350 using a file transfer module 356.

A format conversion module 358 may inject software objects not recognized by the COTS deployment application 352. If, for example, the COTS deployment application 352 is a downstream WSUS application, the format conversion module 358 applies the one or several API functions provided by the Microsoft Corporation to the process control objects in order to make these objects compatible with WSUS. For other software updates, the file transfer module 356 may directly apply identifiers and/or metadata to the COTS deployment application 352. To continue with the example of a downstream WSUS, the file transfer module 356 may directly apply identifiers or metadata related to Windows updates as configuration data so that the downstream WSUS requests only these identified updates from the upstream WSUS.

Generally with respect to FIGS. 5 and 6, it will be noted that the blocks 302-314, 340-348, and 352-358 can be implemented as hardware, software, firmware, or any desired combination thereof. It is also possible to combine some of the blocks 302-314, 340-348, and 352-358 together or, conversely, partition some of these blocks into smaller modules. Moreover, it is possible to distribute some of the blocks 302-314, 340-348, and 352-358 among more than computer host.

Figure 7:
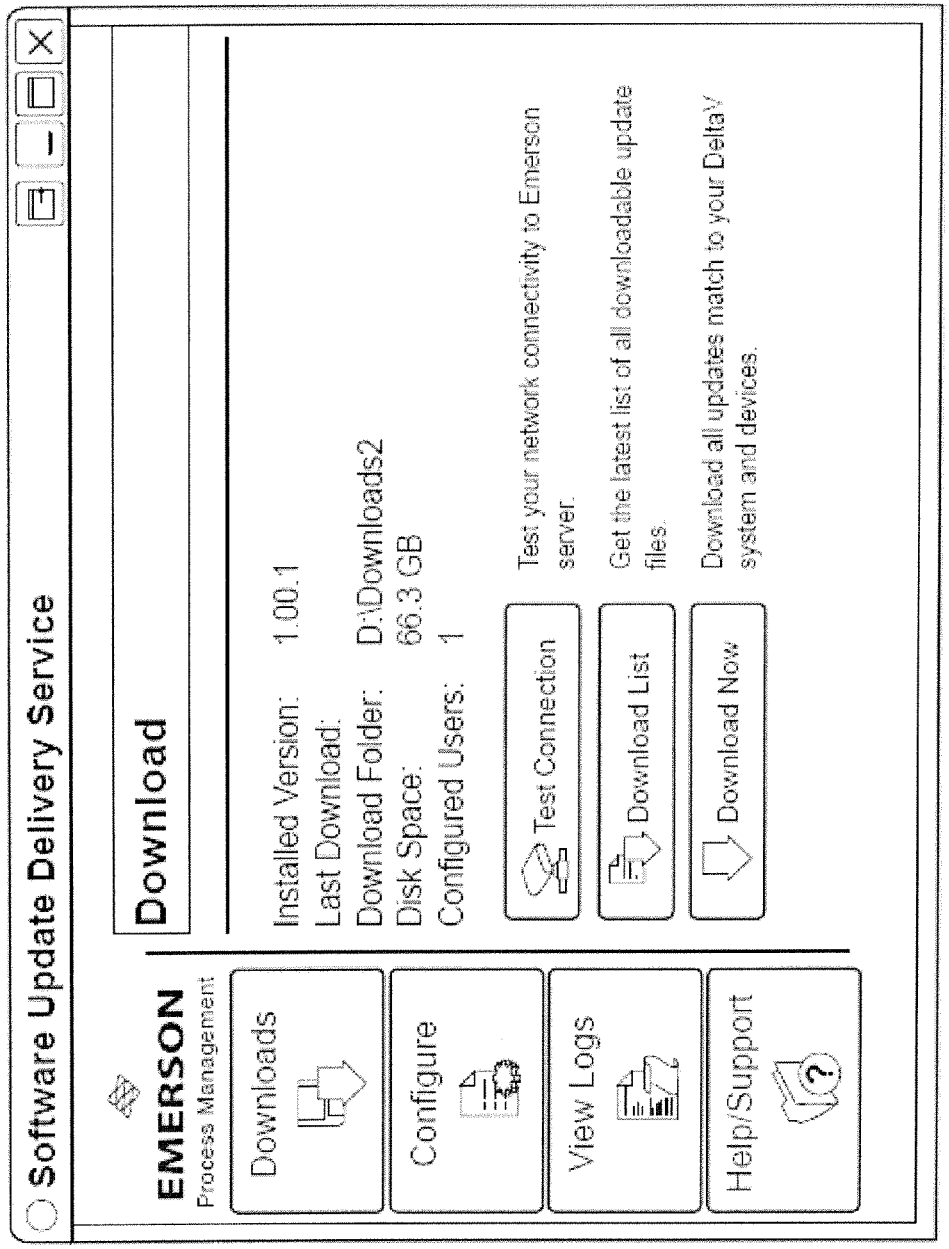
FIG. 7 is an example interface screen which the client application of FIG. 5 may display to an operator of the process control system.

Next, FIG. 7 illustrates an example interface screen 400 which an operator of a process control system may see when operating the client application 16 (see FIGS. 1 and 2). In some situations, an operator may prefer to fully automate the process of detecting, downloading, and deploying software updates, and accordingly may disable the interface screen 400. In other situations, however, an operator may wish to manually check whether updates are available using a control "Download List," initiate a download using a control "Download Now," test network connectivity using a control "Test Connection," etc. As further illustrated in FIG. 7, the interface screen 400 may indicate which version of the process control system is currently installed in the process control layer 24, when the last download of updates has occurred, where the downloads should be stored, how much memory is available for the downloads, etc. Additionally, the operator may click on a control "Configure" to specify an automated update schedule, to configure the interaction between the front-end and the back-end components of the client application, etc. Moreover, a "View Logs" control allows the operator to access the history of previous downloads and the associated events.

Figure 8:
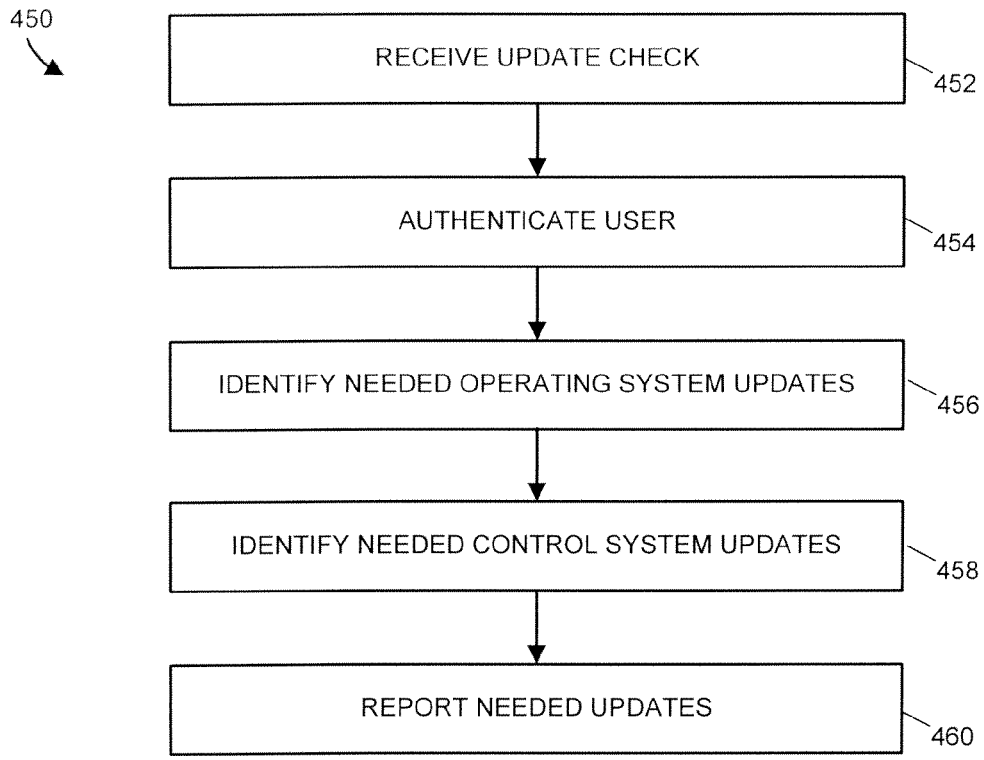
FIG. 8 is a flow diagram of an example method for processing queries from a customer which may be implemented by the server application of FIG. 4.
Figure 9:
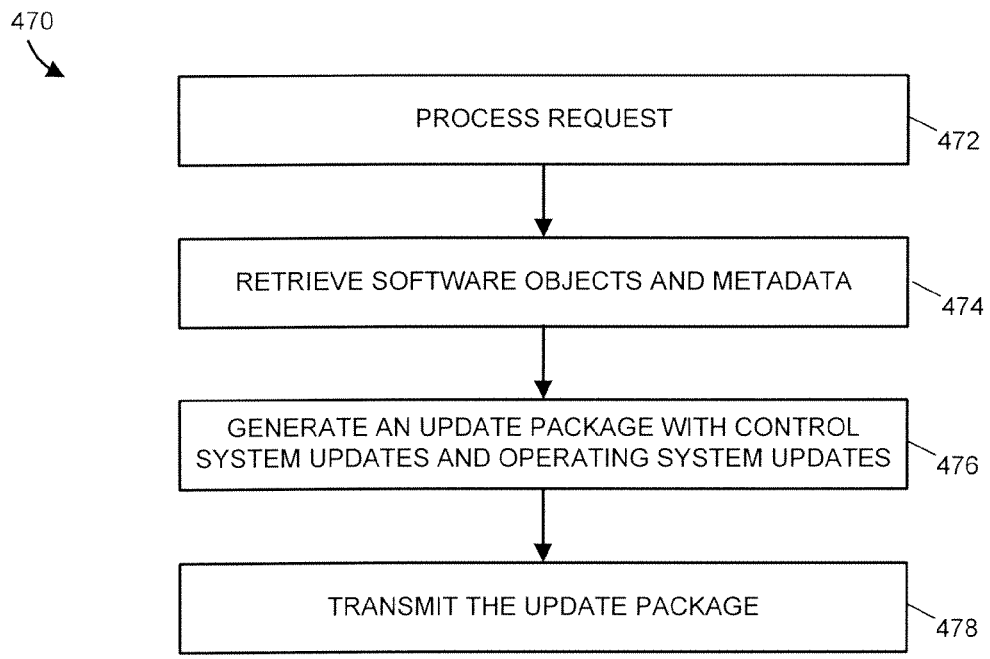
FIG. 9 is a flow diagram of an example method for processing update requests from a customer which may be implemented by the server application of FIG. 4.
Figure 10:
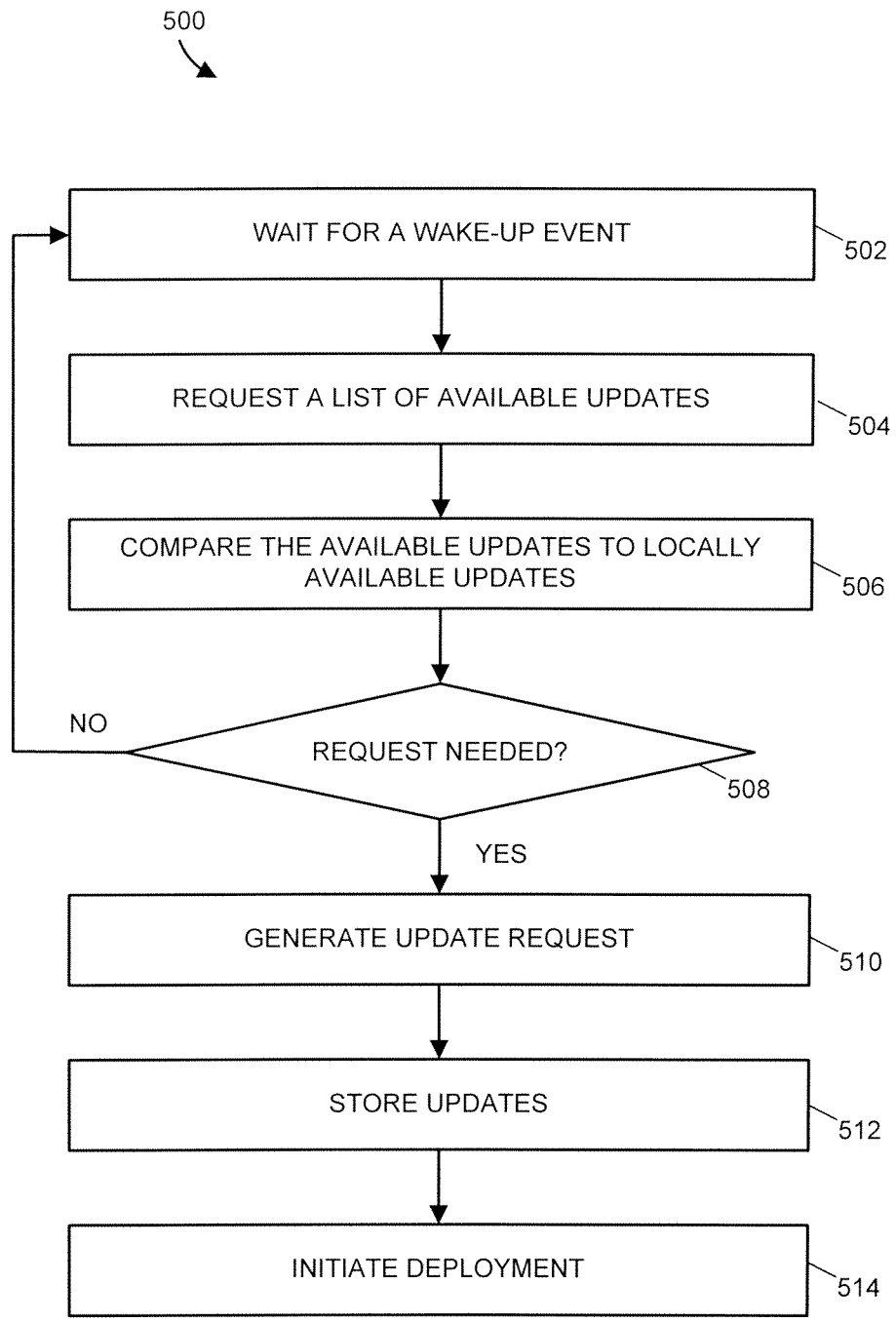
FIG. 10 is a flow diagram of an example method for querying and requesting software updates which may be implemented by the client application of FIG. 5.

FIGS. 8-10 next illustrate respective flow diagrams of example methods for carrying various function of a system for automated deployment of updates such as the software update system 12. For example, the server application 14 may implement a method 450 to process a Check Available Updates from the client application 16 and a method 470 to process an Update Request message from the client application 16, while the client application 16 may implement a method 500 to initiate and process queries and software update requests.

Referring to FIG. 8, the server application 14 may receive a request to check for updates in block 452, authenticate the corresponding customer in block 454, and identify software updates required for the operating system and the process control system used in the customer system in blocks 456 and 458, respectively. As discussed above, the server application 14 may maintain a list of updates to the operating system that have been tested and approved by the technical staff of the process control system vendor. The technical staff may similarly check and approve or reject updates to one or several antivirus applications. As discussed in detail above, the server application 14 may recommend software updates to the client application 16 in view of at least the version of the operating system being used at the customer system 26 and the current version of the process control system 74. In block 460, the server application 14 may report the list of available and approved updates to the client application 16.

Now referring to FIG. 9, the server application 14 may receive a request specifying one or several software updates in block 472. The server application 14 may then retrieve the requested software objects and/or metadata in block 474, and generate an update package for the client application 16 in block 476. The server application 14 may then transmit the update package to the client application 16 in one or multiple messages using any known techniques such as via HTTP, using an FTP client/server pair, or via any other suitable protocol (block 478).

With reference to FIG. 10, the client application 16 may wait for a wake-up event in block 502. In response to a wake-up event (e.g., a user command, timer expiration), the client application 16 may request a list of available software updates in block 504, receive the list from the server application 14, and compare the list to the updates already available in the network in block 506. If the client application 16 determines that at least one software update is required at block 508, the method 500 proceeds to block 510; otherwise, the method 500 returns to block 502.

At block 510, the client application 16 generates and transmits a message specifying which updates are being requested from the server application 14. The client application 16 then receives the software updates as software objects, metadata, or identifiers of software updates managed by another application (e.g., WSUS) in block 512. In block 514, the client application 16 initiates a direct or indirect deployment of the downloaded software updates. More specifically, the client 16 may include a component that distributes and installs software objects in accordance with the metadata that describes the location, update behavior, and installation parameters for each object. Alternatively, the client application 16 may interact with a separate deployment application to request the installation of process control updates on behalf of the client application 16, and control the deployment of software updates to the operating system by configuring the deployment application.

From the foregoing, it will be appreciated that the software update system 12 and the associated techniques discussed above provide numerous advantages to customers that use software systems in general, and complex specialized software systems such as process control systems in particular. To specifically consider the process control industry, in which a plant operator typically relies on a process control system to safely and reliably manage the corresponding process plant, these advantages include (but are not limited to) the following: a significant reduction of the risk of installing a software update that conflicts with a critical function of the process control system, thereby threatening operators' safety or causing a plant shutdown; elimination of the requirement that a process control operator sometimes perform network administration at the expense of other tasks; deployment of updates immediately upon approval by the vendor of the process control system, thus eliminating dangerous delays in deployment of important software updates; and elimination of unnecessary or even harmful updates that require operators' time and effort as well as network downtime. Moreover, the techniques discussed above allow the process control system vendor to deploy process control system upgrades or patches at the same time as updates to the operating system, thus saving operator effort and improving the overall user experience. In yet another aspect, these techniques seamlessly integrate familiar COTS update and deployment applications, such as upstream and downstream WSUS applications, into the process of updating process control systems. Still further, because these techniques allow presenting non-native process control system updates as native updates to COTS applications (e.g., by wrapping software objects), corporate IT personnel can monitor security update compliance of a network layer in which the process control system is implemented without manually checking memoranda from the process control vendor or confirming the requirements with process control operators.

While the present system and methods have been described with reference to specific examples, which are intended to be illustrative only and not to be limiting of the disclosure, it will be apparent to those of ordinary skill in the art that changes, additions and/or deletions may be made to the disclosed embodiments without departing from the spirit and scope of the disclosure.

What is claimed is:

1. A software update system for use in a computer network to automatically deploy software updates, wherein the computer network includes a host that executes an operating system and process control software, and a process control layer in which the host operates and a secure layer that separates the process control layer from an external network, wherein the process control software controls operation of a process plant having one or more controllers, field devices and user interfaces that perform steps to perform physical control of the process plant;

the automated software update system comprising:
a first client application, stored as a first set of instructions on a non-transitory computer-readable medium, to receive a set of software objects associated with the operating system from a first server communicatively coupled to the process plant for updating the operating system in the computer network, wherein the first server communicatively coupled to the process plant is operated by a provider of the operating system;
a second client application, stored as a second set of instructions on a non-transitory computer-readable medium, to receive metadata related to the software objects from a second server communicatively coupled to the process plant, wherein the second server communicatively coupled to the process plant is operated by a provider of the process control software; wherein
the metadata specifies which of the set of software objects have been approved by the provider of the process control software for use with the process control software and the operating system being executed on the host;
wherein the second client application is further adapted to specify which of the software objects are to be deployed to the host that executes the operating system and process control software; and wherein
the second client application includes:
a front-end module to be run in the secure layer and receive the metadata from the second server communicatively coupled to the process plant via the external network; and
a back-end module to be run in the process control layer and receive the metadata from the front-end module.

2. The software update system of claim 1, further comprising:
a deployment application, stored as a third set of instructions on a non-transitory computer-readable medium, to automatically install one or several software updates on the host; wherein
the second client application is adapted to transmit a message to the deployment application to initiate deployment of the specified software objects.

3. The software update system of claim 1, wherein the second client application is further adapted to receive:
a software object associated with the process control software; and
metadata related to the software object associated the process control software.

4. The software update system of claim 3, wherein the second client application includes a format conversion module to apply a wrapper to the software object associated with the process control software to generate a wrapped software object, so that the wrapped software object and the software objects associated with the operating system are compatible with a common deployment application.

5. A software update system for automatically delivering software updates to a computer host that executes an operating system and process control software and wherein the computer host operates in a process control layer of an operator network, and wherein the operator network further includes a secure layer disposed between the process control layer and an external network to prevent direct access from the external network to the process control network, wherein the process control software controls an operation of a process plant having one or more controllers, field devices and user interfaces that perform steps to perform physical control of the process plant;

the software update system comprising:
a client application stored as a first set of instructions on a non-transitory computer-readable medium, communicatively coupled to the process plant, to generate a request for one or more software updates applicable to the computer host, receive software update data including metadata related to a software update, and to initiate automatic deployment of the software update to the host that executes an operating system and process control software to control the operation of the process plant using the software update data including metadata; and
a server application stored as a second set of instructions on a non-transitory computer-readable medium, communicatively coupled to the process plant, to provide the software update data including metadata to the client application in response to receiving the request, wherein
the metadata specifies that the software update has been approved by a provider of the process control software for use with the process control software and the operating system on the computer host,
wherein the client application includes:
a front-end module installed in the secure layer to receive the software update and software update data including metadata from the server application; and
a back-end module installed in the process control layer to retrieve the software update and software update data including metadata from the front-end module and initiate deployment of the software update within the process control network.

6. The software update system of claim 5, wherein the software update includes at least one of:
a software object associated with at least one of the process control software, an operating system used being used by the computer host, or an antivirus software being run in a computer network including the computer host; and
metadata related to the at least one software object.

7. The software update system of claim 6, wherein the metadata specifies at least one of file size, update behavior, installation instructions, and target computer identity.

8. The software update system of claim 5, wherein the software update is for updating the process control software.

9. The software update system of claim 5, wherein the software update is for updating the operating system.

10. The software update system of claim 5, wherein the front-end module includes:

a message generator to generate a query to request a list of approved software updates; and
an update list processor to receive a list of one or more approved software updates, and to compare the list with data stored in a repository disposed in the secure layer; wherein
the message generator further generates the request for the one or more software updates if the one or more approved software updates are not available in the repository.

11. The software update system of claim 5, wherein the front-end module includes a scheduler to generate a periodic event in response to which the front-end module generates the request for the one or more software updates.

12. The software update system of claim 5, wherein the software update includes a software object associated with the process control software; and wherein the back-end module includes:
a format conversion module to apply a wrapper to the software object to generate a wrapped software object, wherein the wrapped software object is compatible with an commercial off-the-shelf (COTS) deployment application.

13. The software update system of claim 5, wherein the back-end module is adapted to retrieve the software update from the front-end module without the front-end module receiving a manual approval from a human operator.

14. The software update system of claim 5, wherein the computer host operates in a process control layer of an operator network, wherein the client application runs in the operator network, and wherein the server application runs in a network operated by a provider of the process control software; wherein the server application includes:
a control system interface to receive the request from the operator, wherein the request includes operator authentication data;
a user authenticator to authenticate the operator based on the operator authentication data; and
a control system identifier to determine a version of the process control software installed in the process control layer of the operator network.

15. A method in a computer system for automatically deploying software updates to a network operated by a customer and having a process control layer in which at least one host implements process control software, wherein process control software is implemented by at least one host to operate a process plant having one or more controllers, field devices and user interfaces that perform steps to perform physical control of the process plant, and wherein the network operated by the customer further includes a secure layer disposed between the process control layer and an external network to prevent direct access from the external network to the process control network;
the method comprising:
receiving a query from the customer, wherein the query is a first electronic message transmitted to the computer system via a communication link coupled to the process plant;
executing a database query to identify one or more software updates applicable to the process control layer in response to receiving the query, wherein each of the one or more software updates has been approved for use with the process control system and an operating system being used in the process control layer;
generating software update data including metadata corresponding to the one or more software updates, wherein the software update is stored on a computer-readable medium and the metadata specifies that the one or more software updates has been approved by a provider of the process control software for use with the process control software and the operating system on the computer host; and
transmitting, in a second electronic message, the software update data including metadata to a front-end module of the host run in the secure layer, wherein the host implements process control software to operate a process plant in the network operated by the customer; and
retrieving the second electronic message via a back-end module of the host run in the process control layer.

16. The method of claim 15, wherein generating software update data includes at least one of:
providing software objects associated with the process control system and metadata related to the software objects associated with the process control system;
providing metadata related to software objects associated with the operating system; and
providing metadata related to software objects associated with an anti-virus software being used in the network operated by the customer.

17. The method of claim 15, further comprising authenticating the client using login and password data included in the query.

18. The method of claim 15, further comprising, prior to generating software update data and transmitting the software update data to the host:
transmitting a list of available updates to the host in a third electronic message; and
receiving a fourth electronic message that indicates which of the available updates specified in the list of available updates are to be transmitted in the second electronic message.

19. A software update method for deploying software updates to a host that operates in a client computer network and executes process control software wherein the host operates in a process control layer of an operator network, wherein the operator network further includes a secure layer disposed between the process control layer and an external network to prevent direct access from the external network to the process control network, and wherein the process control software execute controls for operating a process plant having one or more controllers, field devices and user interfaces that perform steps to perform physical control of the process plant;
the method comprising:
generating a query from the client computer network to request information related to software updates approved for use with the process control system and an operating system currently being used by the host;
transmitting the query from the client computer network to a provider of the process control system as a first electronic message;
receiving at a front-end module run in the secure layer of the client computer network, a response to the query as a second electronic message, and retrieving the response via a back-end module run in the process control layer, wherein the response includes software update data including metadata indicating which of a set of available updates has been approved by the provider of the process control system for use with the process control software and the operating system being executed on the host; and
initiating automatic deployment of the software update to the host that operates in a computer network and executes process control software for operating a process plant based on the software update data including metadata.

20. The method of claim 19, wherein generating the query includes generating the query in response to a timer expiration event.

21. The method of claim 19, wherein initiating automatic deployment includes:
applying a wrapper to a software object included in the software update to generate a wrapped software object if the software update is associated with the process control software; and
transmitting the wrapped software object to an off-the-shelf (COTS) deployment application if the software update is associated with the process control software.

22. The method of claim 19, further comprising transmitting a command to a client update application if the software update data includes metadata related to a software object associated with the operating system, wherein the client update application is responsible for providing software updates associated with the operating system, and wherein the command specifies one or several software updates associated with the operating system.

23. A software application stored as a set of instructions on a non-transitory computer-readable medium for use in a client computer network in which a host executes an operating system and process control software;
wherein the process control software executes instructions to operate a process plant having one or more controllers, field devices and user interfaces that perform steps to perform physical control of the process plant and wherein the computer host operates in a process control layer of an operator network, and wherein the operator network further includes a secure layer disposed between the process control layer and an external network to prevent direct access from the external network to the process control network;
the software application comprising:
a message generator to generate a query requesting software update data including metadata, wherein the software update data including metadata specifies which of the set of software updates have been approved by a provider of the process control software for use with the process control software and the operating system being executed on the host;
a first interface to transmit the query from the client computer network to the provider of the process control software;
an update list processor, installed as part of a front-end module in the secure layer, to receive one or more available software updates and to receive the software update data including metadata at the client computer network indicating which of the set of available updates has been approved for deployment to a computer executing the operating system and the process control software by the provider of the process control software; and
a second interface, installed as part of a back-end module in the process control layer, to initiate deployment of the one or more software updates, retrieved from the update list processor, to the one or more hosts that execute an operating system and process control software to operate a process plant based on the software update data including metadata; wherein
each of the one or more software updates is associated with at least one of the process control software and the operating system.

* * * * *